United States Patent
Chen et al.

(10) Patent No.: US 11,042,459 B2
(45) Date of Patent: Jun. 22, 2021

(54) METHOD AND COMPUTER STORAGE NODE OF SHARED STORAGE SYSTEM FOR ABNORMAL BEHAVIOR DETECTION/ANALYSIS

(71) Applicant: Silicon Motion Technology (Hong Kong) Limited, Kowloon (HK)

(72) Inventors: Jian-Ying Chen, Taipei (TW); Po-An Yang, New Taipei (TW)

(73) Assignee: Silicon Motion Technology (Hong Kong) Limited, Kowloon (HK)

( * ) Notice: Subject to any disclaimer, the term of this patent is extended or adjusted under 35 U.S.C. 154(b) by 0 days.

(21) Appl. No.: 16/408,477

(22) Filed: May 10, 2019

(65) Prior Publication Data

US 2020/0356454 A1    Nov. 12, 2020

(51) Int. Cl.
*G06F 11/30* (2006.01)
*H04L 29/08* (2006.01)
*G06F 11/34* (2006.01)
*G06F 11/32* (2006.01)

(52) U.S. Cl.
CPC ...... *G06F 11/3034* (2013.01); *G06F 11/3055* (2013.01); *G06F 11/32* (2013.01); *G06F 11/34* (2013.01); *H04L 67/22* (2013.01)

(58) Field of Classification Search
CPC .. G06F 11/3034; G06F 11/3055; G06F 11/32; G06F 11/34; H04L 67/22
See application file for complete search history.

(56) References Cited

U.S. PATENT DOCUMENTS

| | | | | |
|---|---|---|---|---|
| 9,298,854 | B2* | 3/2016 | Ikawa | G06F 16/90344 |
| 2005/0055287 | A1* | 3/2005 | Schmidtberg | G06Q 10/0833 |
| | | | | 705/28 |
| 2008/0250497 | A1* | 10/2008 | Mullarkey | H04L 41/142 |
| | | | | 726/22 |
| 2017/0208151 | A1* | 7/2017 | Gil | H04L 67/1097 |
| 2018/0039529 | A1* | 2/2018 | Lehmann | G06F 11/079 |
| 2019/0182119 | A1* | 6/2019 | Ratkovic | H04L 43/045 |

(Continued)

FOREIGN PATENT DOCUMENTS

| | | |
|---|---|---|
| TW | I243314 | 11/2005 |
| TW | I331868 | 10/2010 |

(Continued)

*Primary Examiner* — Ario Etienne
*Assistant Examiner* — Kidest Mendaye
(74) *Attorney, Agent, or Firm* — Winston Hsu

(57) ABSTRACT

A method utilized in a computer storage node includes: providing user interface device to be operated by an operator; providing sensor module to sense operation parameter of computer storage node to generate first detection signal and second detection signal following first detection signal; receiving first detection signal to control display panel of user interface device to display data pattern of first detection signal on display panel according to a time scale; using first portion of first detection signal corresponding to a partial pattern of the data pattern to generate reference signal when the operator uses user interface device to mark a region on display panel to select the partial pattern; receiving second detection signal sent from sensor module after the reference signal is generated; and comparing characteristics of reference signal with characteristics of second detection signal to perform behavior analysis operation.

14 Claims, 5 Drawing Sheets

(56) References Cited

U.S. PATENT DOCUMENTS

2019/0325624 A1\* 10/2019 McRaven ............. G06F 16/367
2019/0392533 A1\* 12/2019 Thurner ........... G06Q 10/06395

FOREIGN PATENT DOCUMENTS

| TW | 201528725 A | 7/2015 |
|---|---|---|
| TW | M509371 U | 9/2015 |
| TW | I533159 B | 5/2016 |
| TW | I591489 B | 7/2017 |
| TW | 201823986 A | 7/2018 |

\* cited by examiner

METHOD AND COMPUTER STORAGE NODE OF SHARED STORAGE SYSTEM FOR ABNORMAL BEHAVIOR DETECTION/ANALYSIS

BACKGROUND OF THE INVENTION

1. Field of the Invention

The invention relates to a distributed shared storage system, and more particular to a computer storage node in the system and a method utilized in the computer storage node.

2. Description of the Prior Art

Generally speaking, the design of operation and maintenance of a shared storage system are big challenges for an IT (information technology) operator user, which may include how to predict whether the performance and capacity of the storage system satisfy the future requirements and/or how to timely generate an alarm report to the operator when an abnormal access behavior is detected so as to make the operator be able to timely response to such abnormal behavior.

SUMMARY OF THE INVENTION

Therefore one of the objectives of the invention is to provide a method utilized in one of computer storage nodes in a distributed shared storage system and a computer storage node, to solve the conventional problems.

According to embodiments of the invention, a method utilized in one of computer storage nodes in a distributed shared storage system is disclosed. The method comprises: providing a user interface device to be operated by an operator; providing a sensor module to sense at least one operation parameter of the computer storage node to generate a first detection signal and a second detection signal following the first detection signal; and providing and utilizing a processor to perform: receiving the first detection signal to control a display panel of the user interface device to display a data pattern of the first detection signal on the display panel according to a time scale; using a first portion of the first detection signal corresponding to a partial pattern of the data pattern to generate a reference signal when the operator uses the user interface device to mark a region on the display panel to select the partial pattern; receiving the second detection signal sent from the sensor module after the reference signal is generated; and comparing characteristics of the reference signal with characteristics of the second detection signal to perform a behavior analysis operation.

According to the embodiments, a computer storage node in a plurality of computer storage nodes in a distributed shared storage system is disclosed. The computer storage node comprises a user interface, a sensor module, and a processor. The user interface device comprises a display panel configured for display information for a user and at least one computer input device operated by an operator. The sensor module is configure to sense at least one operation parameter of the computer storage node to generate a first detection signal and a second detection signal following the first detection signal. The processor is coupled to the user interface device and the sensor module, and is configured for: receiving the first detection signal to control a display panel of the user interface device to display a data pattern of the first detection signal on the display panel according to a time scale; using a first portion of the first detection signal corresponding to a partial pattern of the data pattern to generate a reference signal when the operator uses the user interface device to mark a region on the display panel to select the partial pattern; receiving the second detection signal sent from the sensor module after the reference signal is generated; and comparing characteristics of the reference signal with characteristics of the second detection signal to perform a behavior analysis operation.

These and other objectives of the present invention will no doubt become obvious to those of ordinary skill in the art after reading the following detailed description of the preferred embodiment that is illustrated in the various figures and drawings.

DETAILED DESCRIPTION

The invention provides a solution to solve the conventional problems. Based on the provided solution, an operator can effectively and easily define a portion of a detection signal as normal patterns and/or abnormal patterns via a user interface (UI) device, and the storage system can store the defined normal patterns and/or abnormal patterns as specific reference pattern(s) and then compare characteristics of the reference pattern(s) with characteristics of an incoming detection signal to perform behavior analysis operation so as to decide whether an abnormal operation behavior occurs.

Figure 1:
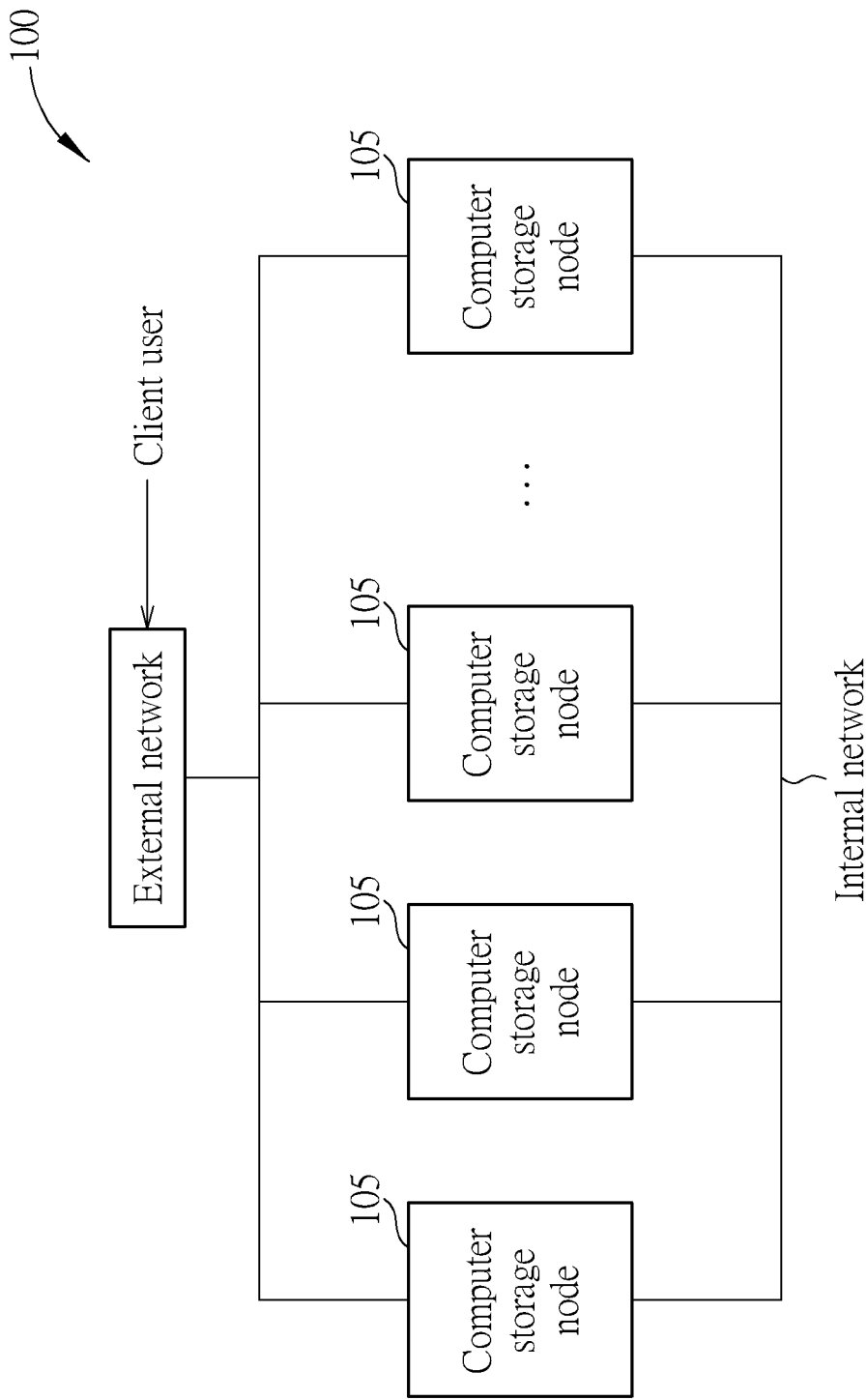
FIG. 1 is a block diagram of a decentralized storage system according to an embodiment of the invention.

FIG. 1 is a block diagram of a decentralized storage system 100 according to an embodiment of the invention. The system 100 is implemented by using a distributed network and comprises multiple computer storage nodes 105, and each computer storage node 105 is connected to other computer storage nodes 105 via an internal shared network. The computer storage nodes 105 are clustered together, a client user can connect to one computer storage node via an external network. If one computer storage node fails, the request of the client user is redirected to another working computer storage node. In addition, the system 100 can support a variety of specific communication protocols such as iSCSI, NFS, Samba, and so on. In addition, the system 100 can support the function of virtual storage. The modifications are not intended to be limitation.

Figure 2:
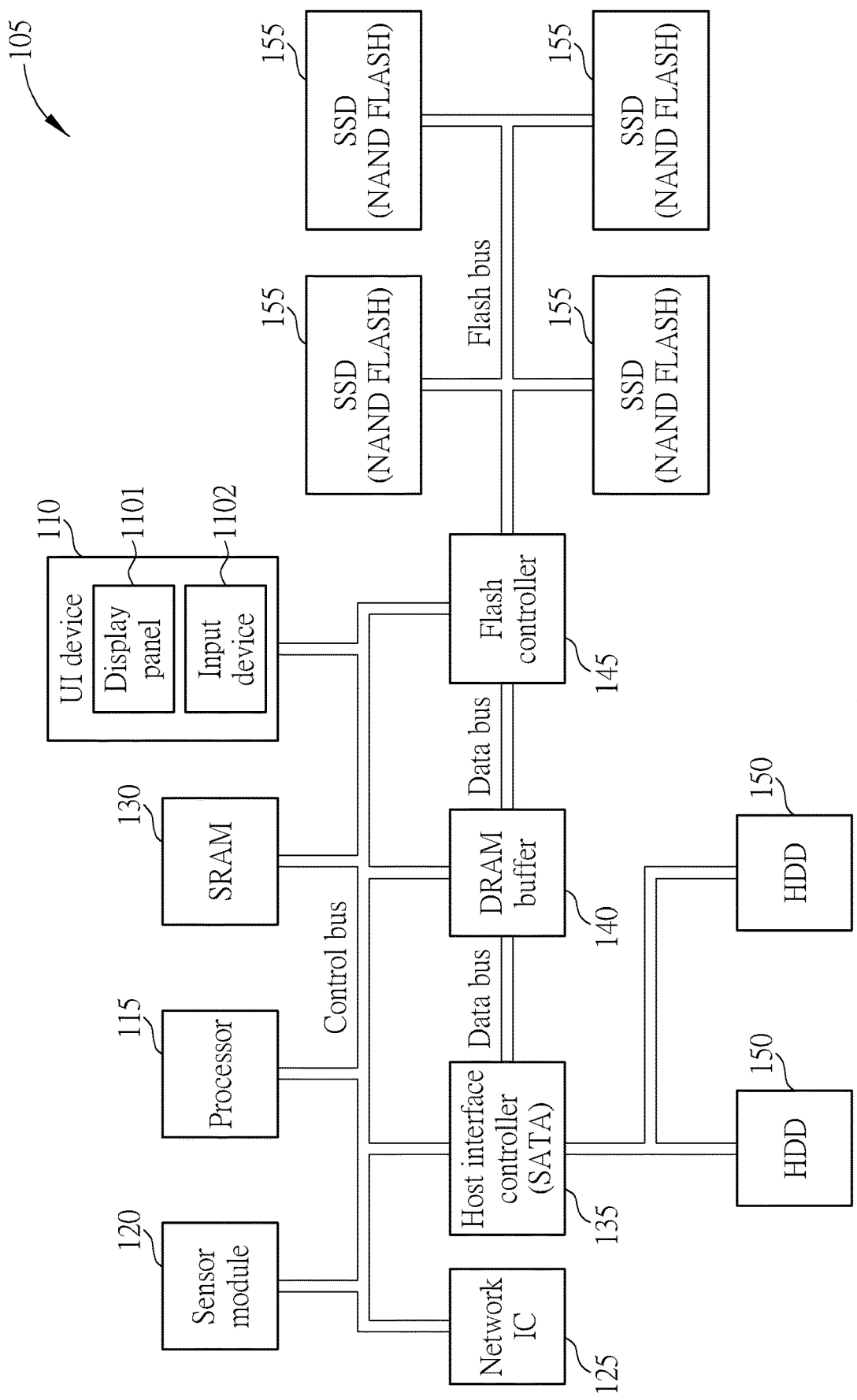
FIG. 2 is a block diagram of a computer storage node according to an embodiment of the invention.

FIG. 2 is a block diagram of a computer storage node 105 according to an embodiment of the invention. The computer storage node 105 comprises an UI device 110, a multi-core processor 115 comprising one or more central processing units (CPU), a sensor module 120, a network interface controller (NIC) 125 such as a network interface card, a static random access memory (SRAM) 130 used as the processor cache, a host interface controller (SATA) 135, a dynamic random access memory (DRAM) buffer 140, a flash controller 145, one or more hard-disk drives (HDD) 150 such as two HDDs, and one or more solid-state drives (SSD) 155 such as four SSDs implemented using NAND flash memory chips. The number of HDDs and the number of SSDs are not intended to be limitations.

The UI device 110 may comprise a display panel 1101 for displaying content/information for an operator and at least one computer input devices 1102 such as a computer keyboard and a computer mouse; the processor 115 is coupled to the display panel 1101 and computer input devices 1102 via the control bus and can send/receive information/signal to/from the display panel 1101 and computer input devices 1102. The UI device 110 is used to display information for the operator/user and receive the input control command of the operator wherein the computer input devices 1102 can be operated by the operator/user.

The processor 115 is coupled to the host interface controller 135, the SRAM 130, the DRAM buffer 140, the sensor module 120, the network IC 125, the UI device 110, and the flash controller 145 via a control bus, and is arranged to send commands to control the above-mentioned devices and perform complex calculations wherein data needed for the complex calculations may be cached in the SRAM 130.

The network IC 125 is used to provide an external network IP so that a client user may connect to the computer storage node 105 via the network IC 125 to access data stored in the HDD 150 or in the SSD 155.

The host interface controller 135 is coupled to the HDDs 150 via another bus, and is used to receive the command sent from the processor 115 to access data stored in the HDDs 150. For example, if a client user request data or another computer storage node request a data clip, the processor 115 send a corresponding control command to the host interface controller 135 and then the host interface controller 135 reads the data or the data clip from the HDD 150 via the another bus so as to write the data or data clip to the DRAM buffer 140 via the data bus. Thus, the client user or the another computer storage node can retrieve the data or data clip from the DRAM buffer 140.

The flash controller 145 is coupled to the SSDs 155 via another bus, and is used to receive the command sent from the processor 115 to access data stored in the SSDs 155. For example, if a client user request data or another computer storage node request a data clip, the processor 115 send a corresponding control command to the flash controller 145 and then the flash controller 145 reads the data or the data clip from the SSD 155 via the flash bus so as to write the data or data clip to the DRAM buffer 140 via the data bus. Thus, the client user or the another computer storage node can retrieve the data or data clip from the DRAM buffer 140.

It should be noted that the embodiment of FIG. 2 is not intended to be a limitation. In other embodiments one computer storage node 105 may comprise only one kind of storage drives such as only the HDDs or only the SSDs.

The processor 115 can execute software programs and calculations to access the storage device such as HDDs 150 and/or SSDs 155, receive detection results/signals generated from the sensor module 120, control the UI device 110 to display data patterns for the operator based on the detection results/signals, and receive inputs/commands of the operator via the UI device 110. The software programs can be stored or recorded in the HDDs 150 or in the SSDs 155 in advanced.

As mentioned above, the UI device 110 can display the data pattern corresponding to the detection signal on its display panel 1101 for the operator which can view the data pattern on the display panel 1101 and accordingly mark a region of a picture displayed on the display panel 1101 to select a partial pattern so as to select a portion of the detection signal by using the computer mouse and then the selection signal portion can be transmitted to the processor 115.

The sensor module 120 is arranged to periodically perform detection upon the computer storage node 105 to repeatedly generate detection signals (i.e. results). For example, the sensor module 120 is used to sense at least one operation parameter of the computer storage device 105 to generate a first detection signal and a second detection signal which follows the first detection signal.

In practice, the sensor module 120 can be implemented by using pure software program algorithms or a combination of software programs and hardware circuits; this is not intended to be a limitation. For example, the sensor module 120 is used to periodically detect or sense at least one of the CPU usage (i.e. a percentage of CPU capacity), network/traffic/packet flow usage, I/O pattern type, CPU temperature, fan speed, storage usage, IOPS (input/output operations per second) of the HDD/SSD, input/output latency, file system operation time, and so on, so as to generate a detection result/signal to the processor 115. That is, the at least one operation parameter comprises the CPU usage (i.e. a percentage of CPU capacity), network/traffic/packet flow usage, I/O pattern type, CPU temperature, fan speed, storage usage, IOPS (input/output operations per second) of the HDD/SSD, input/output latency, file system operation time, and so on.

For example, the software of sensor module 120 may be activated and executed by the processor 115 to sense the CPU usage every N seconds to generate multiple percentage values of the processor 115 during multiple intervals having N seconds wherein N may be equal to five or ten (but not limited), and a detection signal comprises multiple percentage values of the processor 115 every N seconds.

Similarly, the software of sensor module 120 may be activated and executed by the processor 115 to sense the network IC 125 to generate multiple accumulated/average traffic flow amounts of the network IC 125 during different intervals each having identical seconds, and a detection signal in this situation comprises the accumulated/average traffic flow amounts.

Similarly, the sensor module 120 can be used to sense the network IC 125 to obtain the I/O pattern type periodically, and a detection signal may comprise multiple I/O pattern types for different time intervals. For instance, the I/O pattern type may be random I/O, sequential I/O, or other different types. The operation of sensing storage usage, IOPS of the HDD/SSD, latency, and file system operation time can be achieved by using the processor 115 to periodically activate and execute the software of sensor module 120. Further, for sensing the CPU temperature, the sensor module 120 is configured to comprise a physical temperature sensor circuit which is used to sense the temperature of one or more CPUs included in the processor 115 so as to generate detected temperatures, and the processor 115 can activate and execute the software of sensor module 120 to collect the detected temperatures to form a detection signal.

It should be noted that in practice the sensor module 120 is arranged to periodically collect the real-time CPU usage value, calculate a value of real-time network/traffic/packet flow usage, collect a value/bit for indicating real-time I/O pattern type, and collect real-time fan speed, real-time storage usage value, real-time IOPS, real-time latency, and real-time file system operation time. For example, the processor 115 is arranged to execute the software of sensor module 120 to collect the value(s) to obtain a detection signal. Different data values for different time intervals form a detection signal, i.e. a raw detection signal/result. The detection signals generated by the sensor module 120 are sequentially transmitted to the processor 115.

The processor 115 is used to receive the first detection signal to control the display panel 1101 to display a data pattern of the first detection signal on the display panel 1101 according to a time scale, use a first portion of the first detection signal corresponding to a partial pattern of the data pattern to generate a reference signal when the operator uses the computer input device 1102 to mark a region on the display panel 1101 to select the partial pattern, receive the second detection signal sent from the sensor module 120 after the reference signal is generated, and compare characteristics of the reference signal with characteristics of the second detection signal to perform a behavior analysis operation. The characteristics for example comprise at least one of a signal amplitude value, a signal frequency, a frequency distribution, and a peak amplitude value (but not limited). Other characteristics of detection signals can be applied into the operation of behavior analysis.

If the partial pattern is selected by the operator as an abnormal pattern, then the processor 115 is used to generate an abnormal reference signal by using the first portion of the first detection signal corresponding to the abnormal pattern and determine that an abnormal behavior occurs when the characteristics of the abnormal reference signal matches to characteristics of at least one portion of the second detection signal. If the partial pattern is selected by the operator as a normal pattern, then the processor 115 is used to generate a normal reference signal by using the first portion of the first detection signal corresponding to the normal pattern and determine that an abnormal behavior occurs when the characteristics of the normal reference signal do not match to characteristics of a portion of the second detection signal. The processor 115 is arranged to perform abnormal behavior analysis and/or behavior prediction upon an incoming sensor result such as the second detection signal based on a previous sensor result (i.e. the first detection signal).

Figure 3:
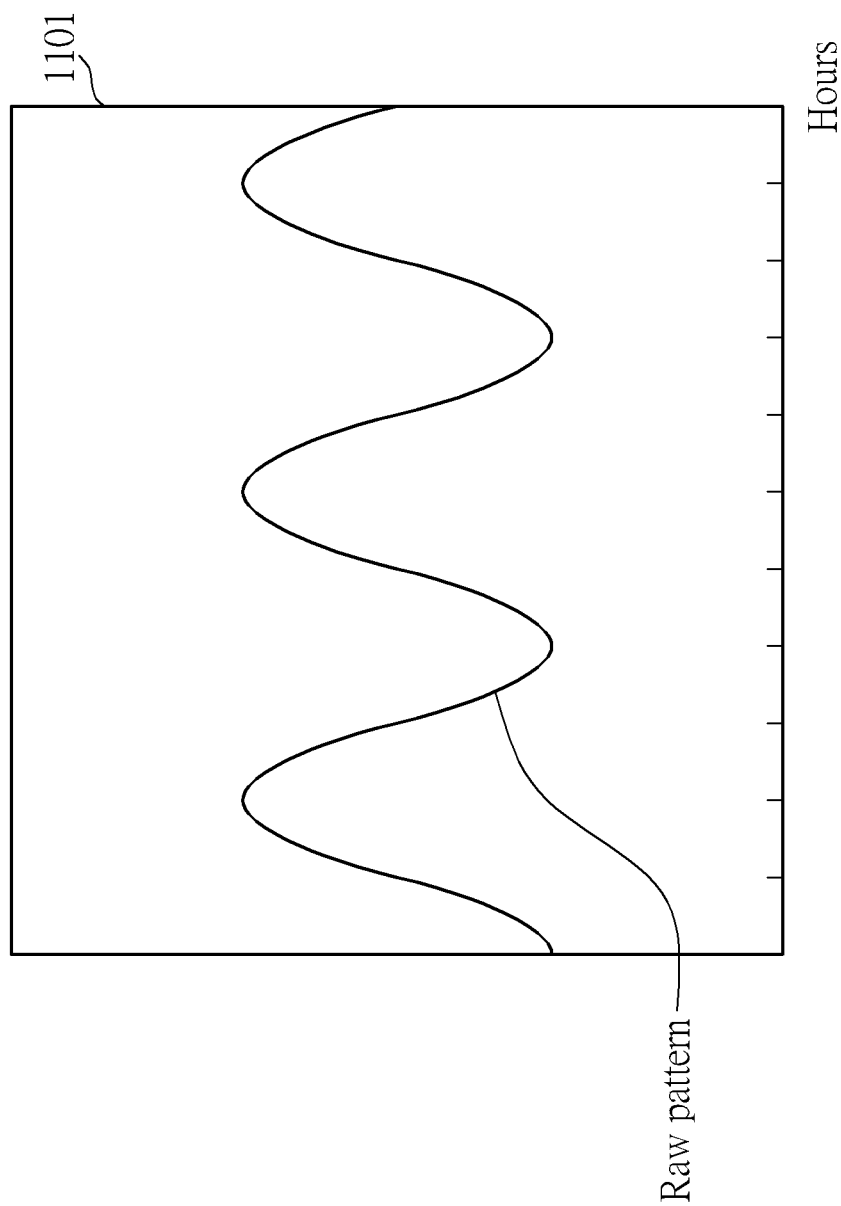
FIG. 3 is a diagram illustrating an example of a raw data pattern displayed on the display panel of the UI device based on a time scale such as hours according to one embodiment of the invention.

FIG. 3 is a diagram illustrating an example of a raw data pattern displayed on the display panel 1101 of the UI device 110 based on a time scale such as hours (but not limited) according to one embodiment of the invention. The time scale may be seconds, minutes, hours, days, weeks, and/or months, and the processor 115 can use or change different time scales to control the display panel of UI device 110 to display different data patterns of the same detection signal for the operator. The operator can directly view the displayed data pattern and then use the computer mouse or computer keyboard to mark/select a region on the display panel 1101 to select a partial pattern of the raw data pattern as a reference pattern (a normal pattern or an abnormal pattern). It is not needed for the operator to key in some fixed values as thresholds to define a normal pattern or an abnormal pattern.

Figure 4:
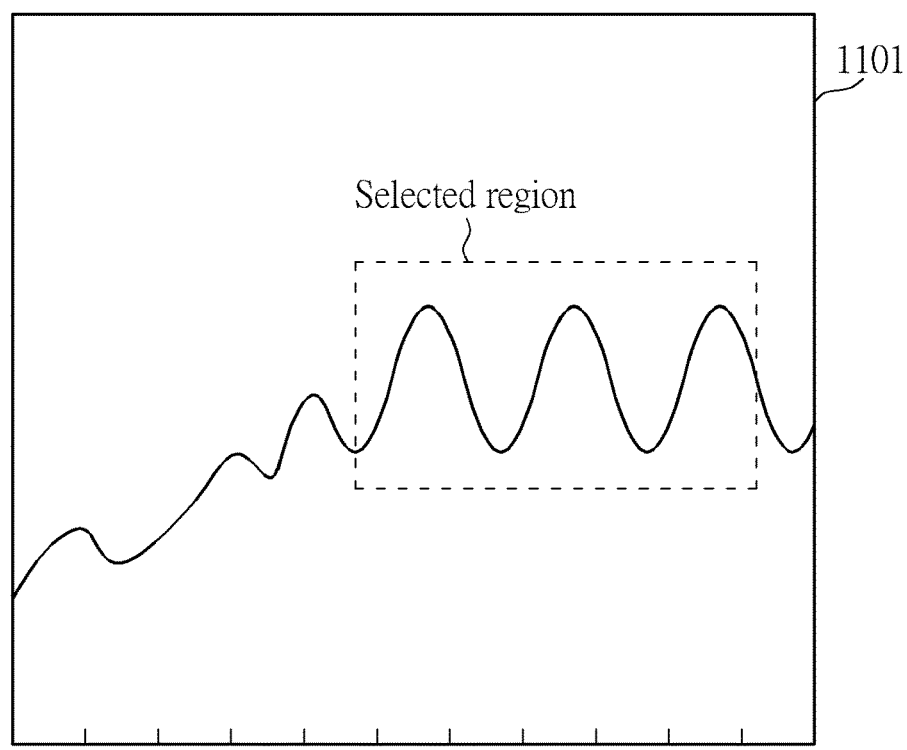
FIG. 4 is a diagram illustrating an example of a raw data pattern displayed on the display panel of the UI device based on a time scale such as hours according to another embodiment of the invention.

FIG. 4 is a diagram illustrating an example of a raw data pattern displayed on the display panel 1101 of the UI device 110 based on a time scale such as hours (but not limited) according to another embodiment of the invention. As shown in the example of FIG. 4, an operator uses the computer mouse or computer keyboard to mark/select a region (shown by dotted lines) to select a partial displayed pattern within the region as a reference normal pattern.

Figure 5:
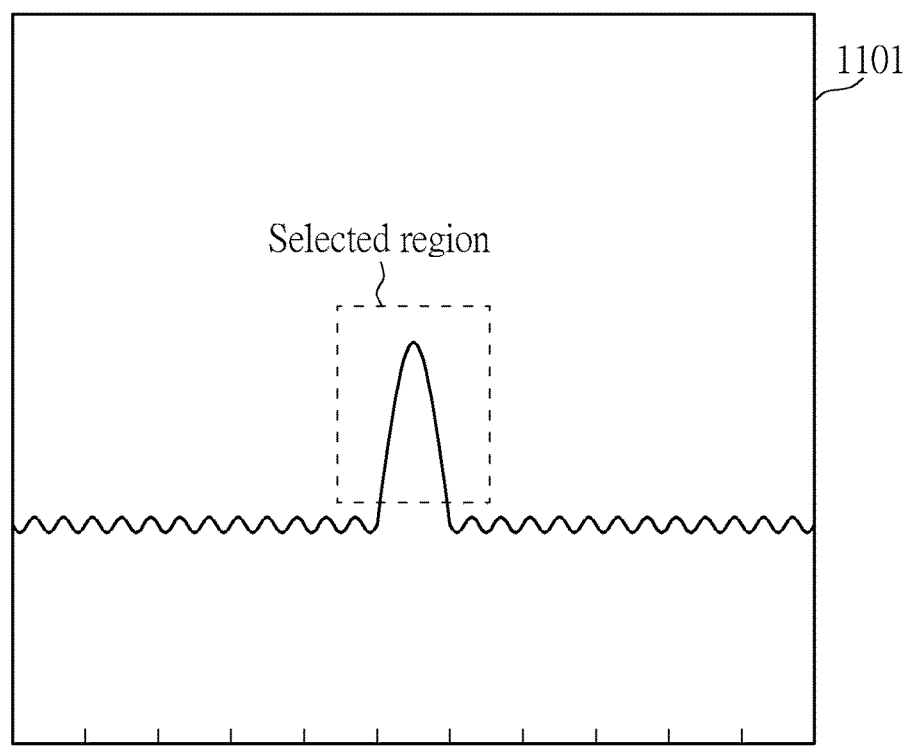
FIG. 5 is a diagram illustrating an example of a raw data pattern displayed on the display panel of the UI device based on a time scale such as hours according to another embodiment of the invention.

FIG. 5 is a diagram illustrating an example of a raw data pattern displayed on the display panel 1101 of the UI device 110 based on a time scale such as hours (but not limited) according to another embodiment of the invention. As shown in the example of FIG. 5, an operator uses the computer mouse or computer keyboard to mark/select a region (shown by dotted lines) to select a partial displayed pattern within the region as a reference abnormal pattern. That is, the operator selects a peak portion of the raw data pattern by using the region to mark the peak portion.

After the operator selects a partial pattern as a normal pattern or as an abnormal pattern, the selected result (i.e. the selected partial pattern) is transmitted to the processor 115. The processor 115 is used to store the selected normal/abnormal pattern and generate a reference normal/abnormal signal according to a portion of the first detection signal corresponding to the selected normal/abnormal pattern. Then the processor 115 is used to compare the characteristics of the reference normal/abnormal signal with the characteristics of the second detection signal to perform the behavior analysis operation.

Figure 6:
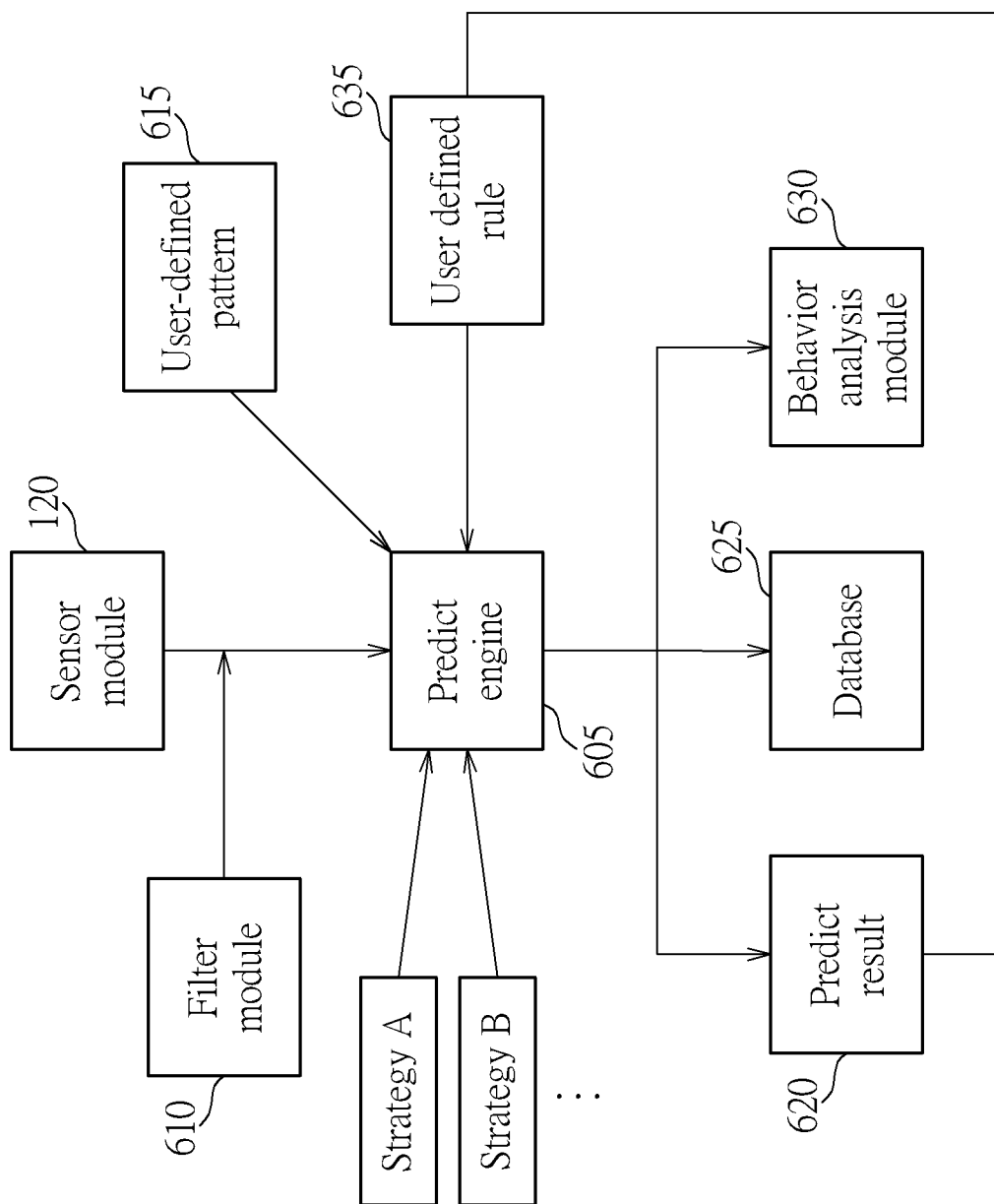
FIG. 6 is a block diagram showing multiple software blocks of programs executed by the processor to real-time perform behavior analysis and prediction for further behavior.

The selected partial pattern is a user-defined normal pattern or a user-defined abnormal pattern. For implementation of software blocks, the processor 115 may be used to activate and execute a predict engine to compare the characteristics of incoming detection signal with the reference signal corresponding to the user-defined normal/abnormal pattern to decide whether an abnormal behavior occurs. FIG. 6 is a block diagram showing multiple software blocks of programs executed by the processor 115 to real-time perform behavior analysis. For example, the predict engine 605 activated and executed by the processor 115 is used to collect and obtain the data signals sent from the sensor module 120.

In addition, a filter module 610 can be employed by the processor 115 to filter out some extreme values in the detection signal(s) to generate processed detection signal(s) to the predict engine 605. Then, the predict engine 605 is arranged to compare characteristics of a processed detection signal with those of the reference signal corresponding to the user-defined normal/abnormal pattern 615 to generate a predict result/signal 620, store the processed detection signal into the database 625, and to generate the decision result (whether the characteristics are matched or not) to the behavior analysis module 630 which is used to determine whether an abnormal behavior occurs according to the decision result. For example, if characteristics of all portions of the processed detection signal match to those of the normal reference signal corresponding to the user-defined normal pattern, then the behavior analysis module 630 will determine that no abnormal behaviors occur. If characteristics of a portion of processed detection signal match to those of the abnormal reference signal corresponding to the user-defined abnormal pattern, then the behavior analysis module 630 will determine that an abnormal behavior occurs.

The predict result 620 then is fed back to predict engine 605 via the user defied rule block 635. The user defined rule block 635 executed by the processor 115 is arranged to select a corresponding rule according to a request of the operator.

For example, the operator may want to adjust the time scale displayed on the display panel 1101 of UI device 110, and the user defined rule block 635 is arranged to adjust the displayed time scale based on the operator's request. After the displayed time scale is adjusted based on the user defined rule block 635, the predict engine 605 is arranged to generate the predict result 620 according to the time scale, the selected strategy, and the user-defined normal/abnormal pattern. The adjusting of time scale is merely used for illustration and is not intended to be a limitation. In addition, the selected strategy is determined by the operator and may be a less aggressive strategy or a more aggressive strategy.

Further, in other embodiments, the detection signal may be converted into the frequency domain by the processor 115 to generate a statistic data pattern/signal having a frequency distribution and then is displayed on the display panel 1101 of UI device 110, so that the operator may select a frequency portion of the statistic data pattern as a normal pattern or as an abnormal pattern. The modification also falls within the scope of the invention.

In addition, the operator can operate the UI device 110 to select a different time scale so that the same detection signal may be displayed with different patterns at different time scales.

In practice, when the operator changes the time scale, the processor 115 is used to generate the data pattern to be displayed on the display panel according to the raw detection signal. The time scales may comprise seconds, minutes, hours, days, weeks, and/or months. In practice, when receiving the first detection signal, the processor 115 for example is arranged to change the time scale to a different time scale, control the display panel 1101 of the user interface device 110 to display a different data pattern of the first detection signal on the display panel 1101 according to the different time scale, use a second portion of the first detection signal corresponding to a partial pattern of the different data pattern to generate another reference signal when the operator uses the user interface device 110 to mark another region on the display panel to select the partial pattern of the different data pattern, receive the second detection signal sent from the sensor module 120 after the another reference signal is generated, and compare characteristics of the another reference signal with characteristics of the second detection signal to perform the behavior analysis operation.

In some situations, even though the partial pattern of the data pattern displayed at the time scale such as minutes is different from the partial pattern of the another data pattern displayed at the different time scale such as hours, the first portion of the first detection signal may be equivalent to the second portion of the first detection signal.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method utilized in one of computer storage nodes in a distributed shared storage system, comprising:
    providing a user interface device to be operated by an operator;
    providing a sensor module to sense at least one operation parameter of the computer storage node to generate a first detection signal and a second detection signal following the first detection signal; and
    providing and utilizing a processor to perform:
        receiving the first detection signal to control a display panel of the user interface device to display a data pattern of the first detection signal on the display panel according to a time scale selected/adjusted by the operator;
        using the display panel displaying the data pattern of the first detection signal for the operator based on the adjusted time scale to make the operator select the data pattern's partial pattern which is located within a region displayed by the display panel, the data pattern's other portions are not located within the region;
        in response to the partial pattern selected by the operator, using a first portion of the first detection signal corresponding to only the partial pattern of the data pattern as a reference signal, the reference signal is generated as a normal reference signal in response to an event that the operator selects the partial pattern as a normal pattern and the reference signal is generated as an abnormal reference signal in response to an event that the operator selects the partial pattern as an abnormal pattern;
        receiving the second detection signal sent from the sensor module after the reference signal is generated; and
        comparing characteristics of the reference signal with characteristics of the second detection signal to perform a behavior analysis operation.

2. The method of claim 1, wherein the partial pattern is selected by the operator as an abnormal pattern, and the step of generating the reference signal comprises:
    generating an abnormal reference signal by using the first portion of the first detection signal corresponding to the abnormal pattern; and
the comparing step comprises:
    determining that an abnormal behavior occurs when the characteristics of the abnormal reference signal matches to characteristics of at least one portion of the second detection signal.

3. The method of claim 1, wherein the partial pattern is selected by the operator as a normal pattern, and the step of generating the reference signal comprises:
    generating a normal reference signal by using the first portion of the first detection signal corresponding to the normal pattern; and
the comparing step comprises:
    determining that an abnormal behavior occurs when the characteristics of the normal reference signal do not match to characteristics of a portion of the second detection signal.

4. The method of claim 1, wherein the at least one operation parameter comprises CPU usage, storage usage, network traffic/flow/packet usage, input/output (I/O) pattern type, CPU temperature, fan speed, input/output operations per second (TOPS), I/O latency, and file system operation time.

5. The method of claim 1, wherein the characteristics of the reference signal comprises at least one of a signal amplitude value, a signal frequency, a frequency distribution, and a peak amplitude value.

6. The method of claim 1, further comprising:
    changing the time scale to a different time scale;
    using the processor to control the display panel of the user interface device to display a different data pattern of the first detection signal on the display panel according to the different time scale;

using a second portion of the first detection signal corresponding to a partial pattern of the different data pattern to generate another reference signal when the operator uses the user interface device to mark another region on the display panel to select the partial pattern of the different data pattern;

receiving the second detection signal sent from the sensor module after the another reference signal is generated; and comparing characteristics of the another reference signal with characteristics of the second detection signal to perform the behavior analysis operation.

7. The method of claim 6, wherein the first portion of the first detection signal is equivalent to the second portion of the first detection signal while the partial pattern of the data pattern displayed at the time scale is different from the partial pattern of the another data pattern displayed at the different time scale.

8. A computer storage node in a plurality of computer storage nodes in a distributed shared storage system, comprising:

a user interface device, comprising:
  a display panel, configured for display information for a user; and
  at least one computer input device operated by an operator;

a sensor module, configure to sense at least one operation parameter of the computer storage node to generate a first detection signal and a second detection signal following the first detection signal; and a processor, coupled to the user interface device and the sensor module, configured for:
  receiving the first detection signal to control a display panel of the user interface device to display a data pattern of the first detection signal on the display panel according to a time scale selected/adjusted by the operator;
  using the display panel displaying the data pattern of the first detection signal for the operator based on the adjusted time scale to make the operator select the data pattern's partial pattern which is located within a region displayed by the display panel, the data pattern's other portions are not located within the region;
  in response to the partial pattern selected by the operator, using a first portion of the first detection signal corresponding to only the partial pattern of the data pattern as a reference signal, the reference signal is generated as a normal reference signal in response to an event that the operator selects the partial pattern as a normal pattern and the reference signal is generated as an abnormal reference signal in response to an event that the operator selects the partial pattern as an abnormal pattern;
  receiving the second detection signal sent from the sensor module after the reference signal is generated; and comparing characteristics of the reference signal with characteristics of the second detection signal to perform a behavior analysis operation.

9. The computer storage node of claim 8, wherein the partial pattern is selected by the operator as an abnormal pattern, and the processor is used to:
  generate an abnormal reference signal by using the first portion of the first detection signal corresponding to the abnormal pattern; and
  determine that an abnormal behavior occurs when the characteristics of the abnormal reference signal matches to characteristics of at least one portion of the second detection signal.

10. The computer storage node of claim 8, wherein the partial pattern is selected by the operator as a normal pattern, and the processor is used to:
  generate a normal reference signal by using the first portion of the first detection signal corresponding to the normal pattern; and
  determine that an abnormal behavior occurs when the characteristics of the normal reference signal do not match to characteristics of a portion of the second detection signal.

11. The computer storage node of claim 8, wherein the at least one operation parameter comprises CPU usage, storage usage, network traffic/flow/packet usage, input/output (I/O) pattern type, CPU temperature, fan speed, input/output operations per second (IOPS), I/O latency, and file system operation time.

12. The computer storage node of claim 8, wherein the characteristics of the reference signal comprises at least one of a signal amplitude value, a signal frequency, a frequency distribution, and a peak amplitude value.

13. The computer storage node of claim 8, wherein the processor is used to:
  change the time scale to a different time scale;
  control the display panel of the user interface device to display a different data pattern of the first detection signal on the display panel according to the different time scale;
  use a second portion of the first detection signal corresponding to a partial pattern of the different data pattern to generate another reference signal when the operator uses the user interface device to mark another region on the display panel to select the partial pattern of the different data pattern;
  receive the second detection signal sent from the sensor module after the another reference signal is generated; and
  compare characteristics of the another reference signal with characteristics of the second detection signal to perform the behavior analysis operation.

14. The computer storage node of claim 13, wherein the first portion of the first detection signal is equivalent to the second portion of the first detection signal while the partial pattern of the data pattern displayed at the time scale is different from the partial pattern of the another data pattern displayed at the different time scale.

* * * * *